US006845531B2

(12) United States Patent
Kjellberg et al.

(10) Patent No.: US 6,845,531 B2
(45) Date of Patent: Jan. 25, 2005

(54) COMBINATION FOR CHAIR AND BED

(75) Inventors: Sture Kjellberg, Bollebygd (SE); Glen Barlow, Savedalen (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/343,757

(22) PCT Filed: Jul. 11, 2001

(86) PCT No.: PCT/SE01/01611
§ 371 (c)(1),
(2), (4) Date: Jul. 10, 2003

(87) PCT Pub. No.: WO02/12015

PCT Pub. Date: Feb. 14, 2002

(65) Prior Publication Data
US 2004/0003463 A1 Jan. 8, 2004

(30) Foreign Application Priority Data
Aug. 4, 2004 (SE) .............................................. 0002825

(51) Int. Cl.$^7$ .............................................. A47C 17/38

(52) U.S. Cl. ............................ 5/118; 5/2.1; 5/136; 5/43

(58) Field of Search ............................... 5/118, 2.1, 133, 5/136, 37.1, 43; 297/354.11, 378.1, 112, 125

(56) References Cited

U.S. PATENT DOCUMENTS

| | | | | |
|---|---|---|---|---|
| 299,528 A | * | 6/1884 | Emery ............................... 5/43 |
| 307,013 A | * | 10/1884 | Carleton ......................... 5/53.2 |
| 357,530 A | * | 2/1887 | Krause ............................. 5/43 |
| 507,576 A | * | 10/1893 | Zislsperger ...................... 5/43 |
| 587,853 A | * | 8/1897 | Ohliger ............................ 5/43 |
| 730,392 A | * | 6/1903 | Owen .............................. 5/43 |
| 781,153 A | * | 1/1905 | Owen .............................. 5/43 |
| 785,763 A | * | 3/1905 | Ritchie .......................... 5/12.1 |
| 791,717 A | * | 6/1905 | Owen .............................. 5/43 |
| 791,718 A | * | 6/1905 | Owen .............................. 5/43 |
| 791,719 A | * | 6/1905 | Owen .............................. 5/43 |
| 791,720 A | * | 6/1905 | Owen .............................. 5/43 |
| 896,277 A | * | 8/1908 | De Witt ........................... 5/43 |
| 956,340 A | * | 4/1910 | Haley .............................. 5/43 |
| 973,108 A | * | 10/1910 | Frye ................................. 5/43 |
| 1,011,952 A | * | 12/1911 | Hansen ....................... 105/315 |
| 1,091,494 A | * | 3/1914 | Filmore et al. .................. 5/43 |
| 1,091,495 A | * | 3/1914 | Filmore et al. ................ 5/133 |
| 1,248,348 A | * | 11/1917 | Larsen ............................. 5/43 |
| 1,303,473 A | * | 5/1919 | Hall ................................. 5/16 |
| 1,367,013 A | * | 2/1921 | Bradshaw ..................... 5/12.1 |
| 1,489,430 A | * | 4/1924 | Dewey ............................. 5/16 |
| 1,609,746 A | * | 12/1926 | Vittone ............................ 5/43 |
| 1,622,702 A | * | 3/1927 | Brown ........................... 5/167 |
| 2,147,011 A | * | 2/1939 | Crawford .................... 105/315 |
| 2,323,069 A | * | 6/1943 | McKinnon ................. 105/315 |
| 2,337,557 A | * | 12/1943 | Jones ......................... 297/115 |
| 2,338,814 A | * | 1/1944 | Jones .......................... 297/63 |

(List continued on next page.)

FOREIGN PATENT DOCUMENTS

| | | | | |
|---|---|---|---|---|
| BE | 000630136 | * | 4/1963 | ..................... 5/2.1 |
| DE | 38 14537 A1 | | 11/1989 | |
| EP | 000011531 A1 | * | 10/1979 | ................... 5/133 |
| EP | 0 036 758 | | 9/1981 | |
| FR | 1.421.590 | | 11/1965 | |

*Primary Examiner*—Robert G. Santos
(74) *Attorney, Agent, or Firm*—Young & Thompson

(57) ABSTRACT

A chair and bed combination in the cab of a vehicle, which chair comprises a seat part and a backrest which are pivotably connected to each other about a first substantially horizontal axis between the lowered sleeping position and a position in which it is folded up against a wall, and a first frame which is arranged in the vehicle cab and on which the chair rests. When the chair is in the folded-down position, the first frame and the chair are arranged under the bed when the bed is lowered into a substantially horizontal sleeping position.

8 Claims, 4 Drawing Sheets

U.S. PATENT DOCUMENTS

Figure 1:
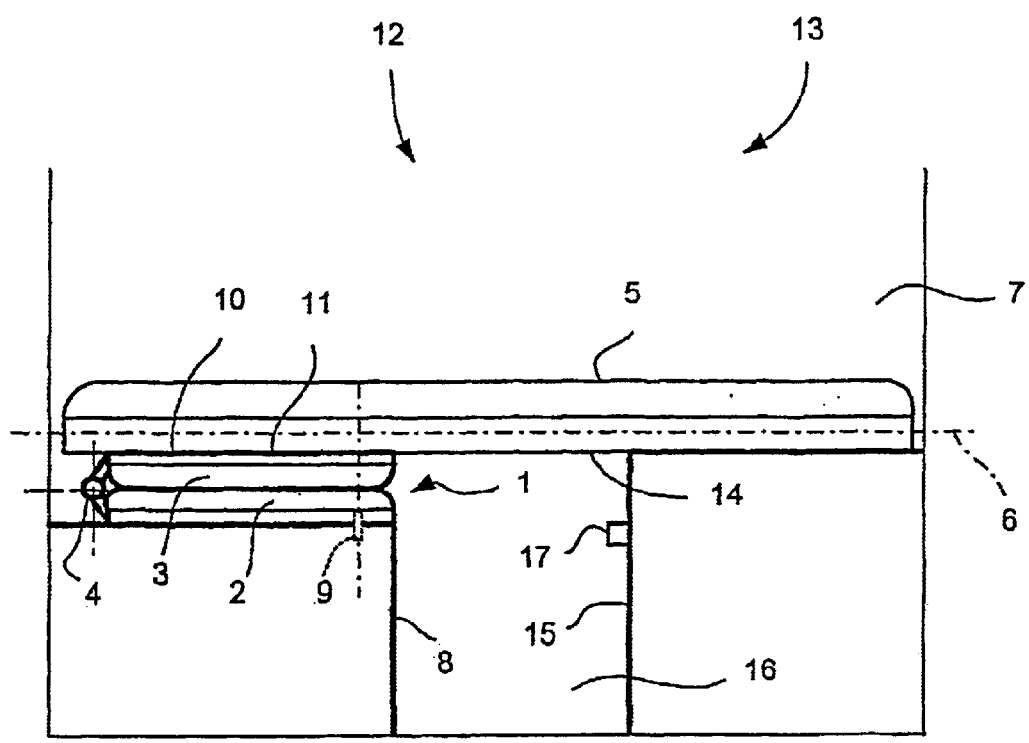

| Patent No. | | Date | Inventor | Class |
|---|---|---|---|---|
| 2,432,572 A | * | 12/1947 | Jones et al. | 5/136 |
| 2,443,552 A | * | 6/1948 | Brack | 5/136 |
| 2,504,769 A | * | 4/1950 | Watter | 105/315 |
| 2,514,032 A | * | 7/1950 | Dean et al. | 5/136 |
| 2,547,446 A | * | 4/1951 | Dean | 297/322 |
| 2,564,512 A | * | 8/1951 | Specht | 5/2.1 |
| 2,600,706 A | * | 6/1952 | Tully et al. | 5/10.1 |
| 2,607,049 A | * | 8/1952 | Hirst | 5/43 |
| 2,634,429 A | * | 4/1953 | Hopeman et al. | 5/43 |
| 2,634,433 A | * | 4/1953 | Woller | 5/142 |
| 2,660,733 A | * | 12/1953 | Williams | 5/9.1 |
| 2,843,856 A | * | 7/1958 | Brown | 5/16 |
| 3,088,127 A | * | 5/1963 | Eames | 5/2.1 |
| 3,588,168 A | * | 6/1971 | Froltzheim et al. | 296/190.02 |
| 4,215,899 A | * | 8/1980 | Schmidt et al. | 296/190.02 |
| 4,462,127 A | | 7/1984 | Schmidt et al. | 5/118 |
| 5,029,929 A | | 7/1991 | Sjostrom et al. | 296/69 |
| 5,136,737 A | * | 8/1992 | Reppas et al. | 5/2.1 |
| 5,621,930 A | * | 4/1997 | Reppas et al. | 5/136 |
| 2003/0121099 A1 | * | 7/2003 | Lim et al. | 5/136 |

* cited by examiner

COMBINATION FOR CHAIR AND BED

The present invention relates to a chair and bed combination in the cab of a vehicle, which chair comprises a seat part and a backrest which are pivotably connected to each other about a first substantially horizontal axis, and which bed is pivotable about a third substantially horizontal axis between the lowered sleeping position and a position in which it is folded up against a wall, and a first frame which is arranged in the vehicle cab and on which the chair rests.

The cabs of lorries and trucks often include a sleeping area behind the driver and passenger chairs. One or more beds are placed above or alongside each other in the sleeping area. The beds are often arranged in the sleeping area in such a way that they can be folded up against a wall, which means that the sleeping area can be used for other purposes, for example for storing freight. However, there is a need for the driver or passenger to be able to use the sleeping area for working in, for example for bookkeeping or similar administrative work. It would also be desirable to be able to use the sleeping area for eating in. The sleeping area is also used if an additional passenger is travelling in the vehicle. As the passenger seat is occupied, the additional passenger must in this case sit or lie on one of the beds in the sleeping area. Since the sleeping area often has a limited floor surface, it becomes very confined in the sleeping area if a passenger chair of the type which is placed alongside the driver's seat is placed in the sleeping area.

It is therefore an object of the present invention to make available a seating place in a vehicle cab which takes up little space and which does not encroach on the sleeping area when a bed arranged in the sleeping area is being used as a sleeping place.

Another object of the invention is to make available a seating place for a passenger in the sleeping area.

Yet another object of the invention is to make available a work place or an eating place in the sleeping area.

This is achieved by means of a chair and bed combination of the type mentioned in the introduction, where the first frame and the chair, in a folded-down position, are arranged under the bed when the bed is lowered into a substantially horizontal sleeping position.

Such a chair and bed combination takes up little space in the vehicle cab since the chair is placed under the bed when the bed is lowered into the sleeping position. This means that the person present in the sleeping area of the vehicle cab can easily get into and out of the bed. Further advantages are obtained by means of the features set out in the dependent claims. By means of the seat part of the chair being pivotably connected to the first frame about a third and substantially vertical axis, the chair can be pivoted to a first position such that the sleeping area can be used as a working or eating place. By pivoting the chair to a second position, the person sitting in the chair will be facing forwards in relation to the vehicle cab, which is expedient if the chair is used as a seating place for a passenger while the vehicle is moving.

Figure 2:
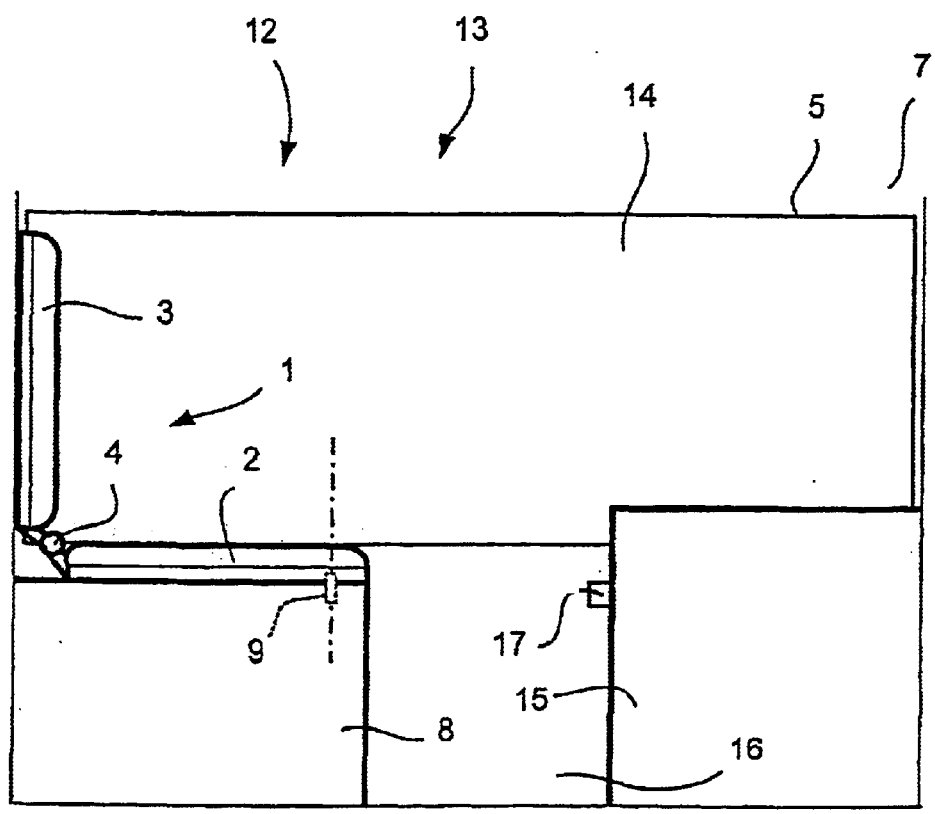
Figure 3:
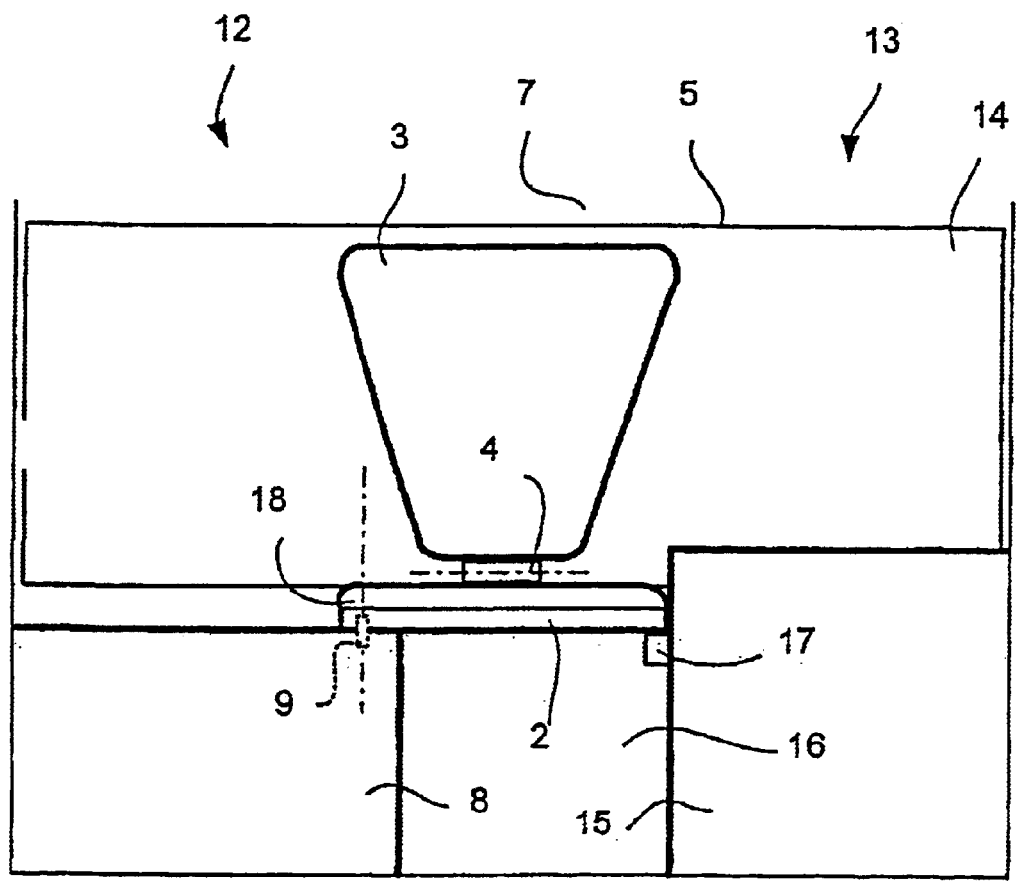
Figure 4:
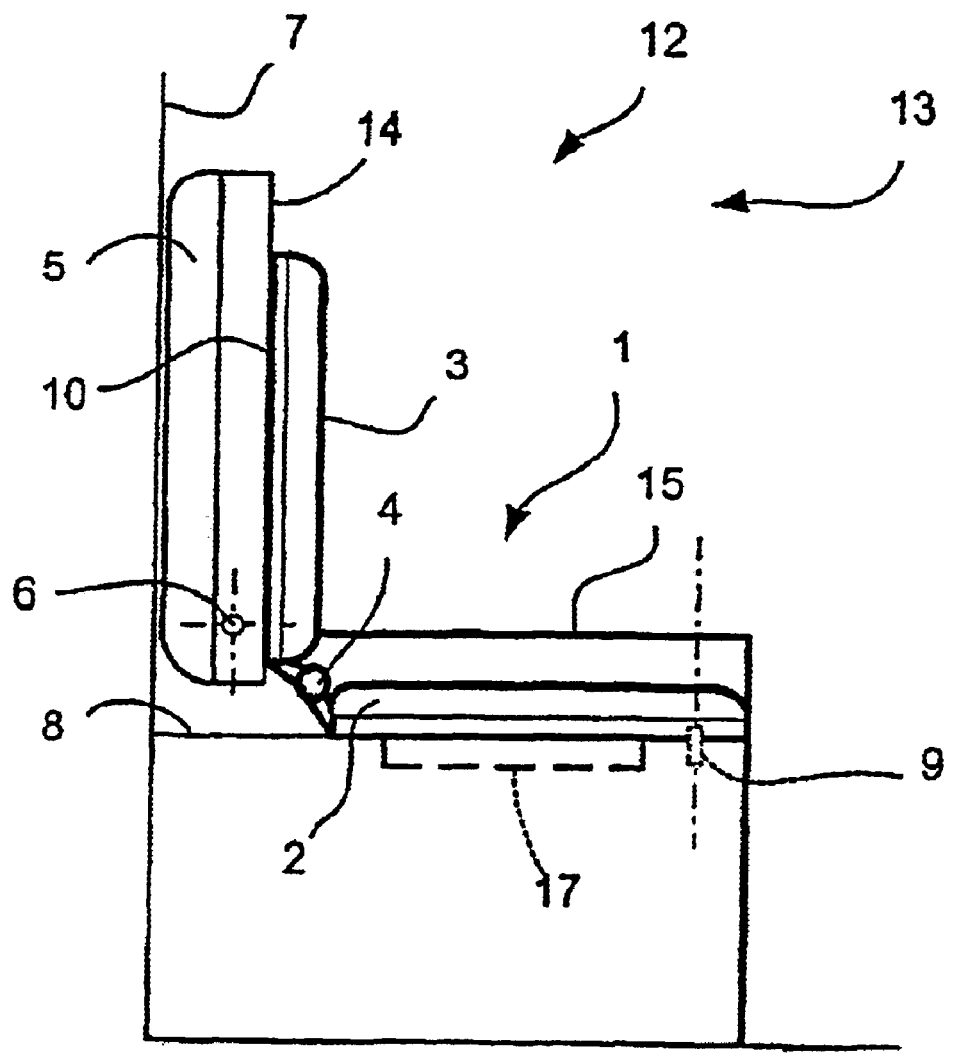

The invention will be explained in more detail on the basis of an illustrative embodiment which is shown in the attached drawings, where:

FIG. 1 shows a chair and bed combination when the chair is folded down and when the bed is lowered into a substantially horizontal sleeping position, FIG. 2 shows the chair and bed combination shown in FIG. 1, when the chair has been folded out and pivoted into a first position and when the bed has been lifted into position against a wall, FIG. 3 shows the chair and bed combination shown in FIG. 1, when the chair has been folded out and pivoted into a second position and when the bed has been lifted into position against a wall, and FIG. 4 shows a side view of the chair and bed combination when the chair and the bed are in the position illustrated in FIG. 3.

In FIG. 1, a chair and bed combination according to the present invention is shown in which a foldable chair 1 is in a folded-down position. The chair 1 comprises a seat part 2 and a backrest 3 which are pivotably connected to each other about a first substantially horizontal axis 4. The bed 5 is pivotable about a second substantially horizontal axis 6 between the lowered sleeping position and a position in which it is folded up against a wall 7. The chair 1 rests on a first frame 8, and the seat part 2 of the chair 1 is pivotably connected to the first frame 8 about a third and substantially vertical axis 9. In the folded-down position, the backrest 3 of the chair 1 is folded against the seat part 2 so that the backrest 3 rests on the seat part 2. When the backrest 3 rests on the seat part 2 when the chair 1 is folded down, the rear surface 10 of the backrest 3 comes to form a substantially horizontal surface 11.

The fold-away chair 1 is arranged in a vehicle cab 12 and preferably in a sleeping area 13 of the vehicle cab 12. To use the sleeping area 13 effectively, the first frame 8 and the chair 1, in the folded-down position, are arranged under the fold-away bed 5 when said bed 5 is lowered into a substantially horizontal sleeping position. When the bed 5 is lowered into the sleeping position, an underside 12 of the bed 5 comes to rest on the rear surface 10 of the backrest 3 of the chair 1. The chair 1 together with the first frame 8 thus comes to bear the weight of the bed 5 when said bed 5 is lowered into the sleeping position.

A second frame 15 is arranged at a distance from the first frame 8 so that leg space 16 for a person sitting on the chair 1 is provided between the first and second frames 8, 15. The bed 5 is arranged to rest on the second frame 15 when the bed 5 is lowered into the sleeping position. Thus, the second frame 15 also comes to bear the weight of the bed 5 when said bed 5 is lowered into the sleeping position. According to the illustrative embodiment shown, the combined height of the first frame 8 and of the folded-down chair 1 corresponds substantially to the height of the second frame 15. The second frame 15 comprises a support element 17 whose function will be explained in more detail below.

FIG. 2 shows the chair 1 in a folded-out position, while at the same time the bed 5 is folded up against the wall 7 of the vehicle cab 12. The chair 1 is pivoted into a first position so that the person sitting on the chair 1 will be side-on to the direction of travel in relation to the vehicle cab 12. The leg space 16 is situated in front of the chair 1 between the first and second frames 8, 15. A table (not shown) can be placed in front of the chair 1 and above the leg space 16 so as to form a working or eating place in the sleeping area 13.

FIG. 3 shows the chair 1 when it has been pivoted about the third axis 9 to a second position. The seat part 2 of the chair 1 then comes to rest on the one hand on the first frame 8 and on the other hand on the support element 17 which is arranged on the second frame 15. When the chair 1 has been pivoted to the second position, said chair 1 is situated above the leg space 16. A person sitting on the chair 1 will then be facing forwards in relation to the vehicle cab 12. By arranging the third axis 9 in an area of a front corner 18 of the seat part 2, a movement of the whole chair 1 in the direction towards the second frame 15 is obtained when the chair 1 is pivoted about the third axis 9.

FIG. 4 shows a side view of the chair 1 in the position which is shown in FIG. 3. It will be seen clearly how the bed 5 is folded up against the wall 7. The rear surface 10 of the backrest 3 of the chair 1 rests against the underside 14 of the bed 5. To ensure that the bed 5 cannot fall forwards and down towards the sleeping position, a catch (not shown) is provided which must release the bed 5 from the folded-up position if the bed 5 is to be lowered towards the sleeping position. A similar catch (not shown) can be provided to lock the backrest 3 in the folded-up position and to lock the seat part 2 when the latter is pivoted to the first or second position.

A safety belt (not shown) can be arranged at the chair 1 so that the person sitting on the chair 1 is secured in said chair 1 while the vehicle is moving. The safety belt can be arranged in such a way that it can be used both when the chair 1 has been pivoted to the first position and to the second position.

What is claimed is:

1. Chair and bed combination in, the cab of a vehicle, which chair (1) comprises a seat part (2) and a backrest (3) which are pivotably connected to each other about a first substantially horizontal axis (4), and which bed (5) is pivotable about a second substantially horizontal axis (6) between the lowered sleeping position and a position in which it is folded up against a wall (7), and a first frame (8) which is arranged in the vehicle cab (12) and on which the chair (1) rests, said first frame (B) and the chair (1), in the folded-down position, are arranged under the bed (5) when the bed (5) is lowered into a substantially horizontal sleeping position, characterized in that the seat part (2) of the chair (1) is pivotably connected to the first frame (8) about a third and substantially vertical axis (9).

2. Chair and bed combination according to claim 1, characterized in that an underside (14) of the bed (5) is arranged to rest on a rear surface (10) of the backrest (3) of the chair (1) when the bed (5) is lowered into the substantially horizontal sleeping position.

3. Chair and bed combination according to claim 1, characterized in that a second frame (15) is arranged at a distance from the first frame (8) so that leg space (16) for a person sitting on the chair (1) is formed between the first and second frames (8,15).

4. Chair and bed combination according to claim 3, characterized in that the bed (5) is arranged to rest on the second frame (15) when the bed (5) is lowered into the substantially horizontal sleeping position.

5. Chair and bed combination according to claim 3, characterized in that the second frame (15) comprises a support element (17) on which the chair (1) rests when the chair (1) has been pivoted about the third axis (9) to a position where the chair (1) is situated above the leg space (16).

6. Chair and bed combination according to claim 2, characterized in that a second frame (15) is arranged at a distance from the first frame (8) so that leg space (16) for a person sitting on the chair (1) is formed between the first and second frames (8,15).

7. Chair and bed combination according to claim 6, characterized in that the bed (5) is arranged to rest on the second frame (15) when the bed (5) is lowered into the substantially horizontal sleeping position.

8. Chair and bed combination according to claim 4, characterized in that the second frame (15) comprises a support element (17) on which the chair (1) rests when the chair (1) has been pivoted about the third axis (9) to a position where the chair (1) is situated above the leg space (16).

* * * * *